US009001825B2

(12) United States Patent
Sait et al.

(10) Patent No.: US 9,001,825 B2
(45) Date of Patent: Apr. 7, 2015

(54) VIRTUAL LINK AGGREGATION USING STATE MACHINE

(71) Applicant: International Business Machines Corporation, Armonk, NY (US)

(72) Inventors: Tamanna Z. Sait, San Jose, CA (US); Venkatesan Selvaraj, Sunnyvale, CA (US); Shoou Yiu, San Jose, CA (US); Yu H. Guo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 13/734,214

(22) Filed: Jan. 4, 2013

(65) Prior Publication Data

US 2014/0192817 A1    Jul. 10, 2014

(51) Int. Cl.
*H04L 12/28* (2006.01)
*H04L 12/935* (2013.01)
*H04L 12/709* (2013.01)

(52) U.S. Cl.
CPC ............... *H04L 49/30* (2013.01); *H04L 45/245* (2013.01)

(58) Field of Classification Search
None
See application file for complete search history.

(56) References Cited

U.S. PATENT DOCUMENTS

| 7,869,432 | B1 | 1/2011 | Mollyn |
| 2006/0098573 | A1 | 5/2006 | Beer et al. |
| 2010/0054260 | A1 | 3/2010 | Pandey et al. |
| 2011/0085570 | A1 | 4/2011 | Kotha et al. |
| 2011/0194562 | A1 | 8/2011 | Simmons et al. |
| 2011/0228767 | A1 | 9/2011 | Singla et al. |
| 2011/0268125 | A1 | 11/2011 | Vobbilisetty et al. |
| 2011/0299536 | A1 | 12/2011 | Cheng et al. |
| 2012/0033672 | A1* | 2/2012 | Page et al. ................. 370/395.53 |
| 2012/0076150 | A1 | 3/2012 | Perlman |
| 2014/0192817 | A1* | 7/2014 | Sait et al. ....................... 370/400 |
| 2014/0198636 | A1* | 7/2014 | Thayalan et al. ............. 370/228 |
| 2014/0247754 | A1* | 9/2014 | Venkata et al. ............... 370/256 |

* cited by examiner

*Primary Examiner* — Robert Wilson
(74) *Attorney, Agent, or Firm* — Mark Vallone

(57) ABSTRACT

Physical links between an access switch and a pair aggregation switches are aggregated into a virtual link aggregation group (vLAG). Each aggregation switch is a local switch to itself and a remote switch to the other aggregation switch. Each aggregation switch maintains a state machine including initialization, local-up, remote-up, and formed states. In the initialization state, the physical link between the access switch and each aggregation switch is down, and the vLAG is down. In the local-up state, just the physical link between the access switch and the local switch is up, and the vLAG is down. In the remote-up state, just the physical link between the access switch and the remote switch is up, and the vLAG is down. In the formed state, the physical link between the access switch and each aggregation switch is up, and the vLAG is up.

19 Claims, 3 Drawing Sheets

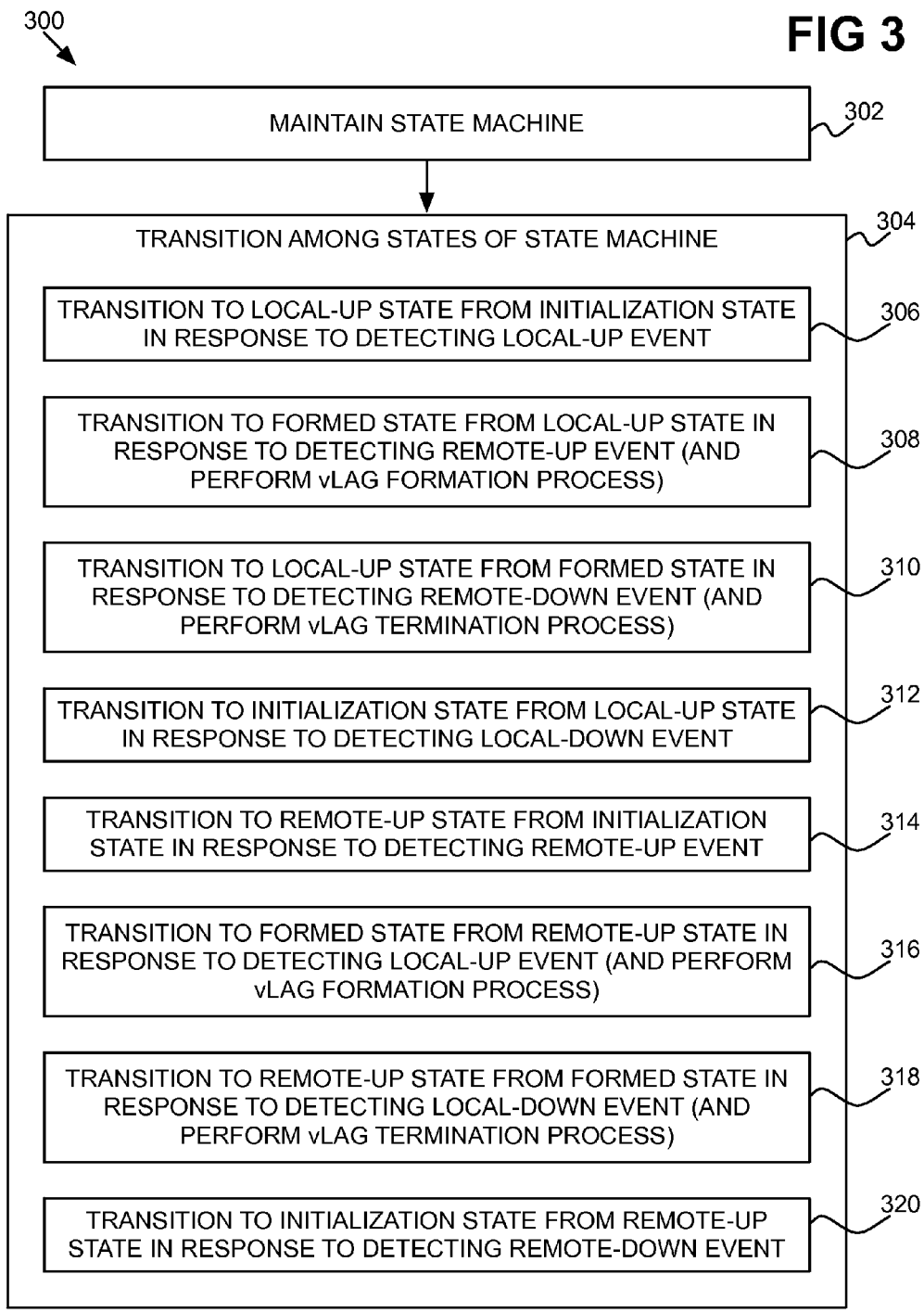

VIRTUAL LINK AGGREGATION USING STATE MACHINE

BACKGROUND

In a common computing device networking topology, an access switch is connected to another switch via a physical link. Client computing devices and other computing devices are connected to the access switch. Server computing devices and other computing devices as well as hardware resources are connected to the other switch. In this way, the former computing devices can communicate with the latter computing devices. For redundancy, bandwidth increasing, and other reasons, more than one physical link may connect the access switch to the other switch, and these physical links aggregated so that they appear as a single link to the access switch.

SUMMARY

A method of an embodiment of the disclosure is for virtual link aggregation among physical links between an access switch and a pair of aggregation switches including a local aggregation switch at which the method is performed and a remote aggregation switch. The method includes maintaining a state machine for the local aggregation switch. The state machine includes a number of states, including an initialization state, a local-up state, a remote-up state, and a formed state. The method includes transitioning among the states of the state machine responsive to detecting the physical links between the access switch and the pair of aggregation switches.

In the initialization state, the physical link between the access switch and the local aggregation switch and the physical link between the access switch and the remote aggregation switch are down, and a virtual link aggregation group (vLAG) is down. In the local-up state, the physical link between the access switch and the local aggregation switch is up, the physical link between the access switch and the remote aggregation switch is down, and the vLAG is down. In the remote-up state, the physical link between the access switch and the remote aggregation switch is up, the physical link between the access switch and the local aggregation switch is down, and the vLAG is down. In the formed state, the physical link between the access switch and the local aggregation switch and the physical link between the access switch and the remote aggregation switch are up, and the vLAG is up.

An aggregation switch of an embodiment of the disclosure includes a hardware network port to communicate with an access switch over a physical link between the access switch and the aggregation switch. The physical link is to be aggregated with a physical link between the access switch and a remote aggregation switch within a vLAG corresponding to a virtual link transparent to the access switch. The aggregation switch includes a communication mechanism to communicate with the remote aggregation switch to receive a status of the physical link between the access switch and the remote aggregation switch as one of up and down. The aggregation switch includes logic to maintain a state machine for the aggregation switch by which the aggregation switch is to assist in aggregation of the physical link between the access switch and the aggregation switch and the physical link between the aggregation access switch and the remote aggregation switch as the vLAG.

A computer program product of an embodiment of the disclosure includes a computer-readable storage medium having executable computer-readable code embodied therein. The executable computer-readable code includes first computer-readable code to transition from an initialization state of a state machine for a local aggregation switch to a local-up state in response to detecting that a physical link between an access switch and the local aggregation switch is up. The executable computer-readable code includes second computer-readable code to transition from the initialization state to a formed state of the state machine in response to detecting that a physical link between the access switch and a remote aggregation switch is up.

The executable computer-readable code includes third computer-readable code to transition from the initialization state to a remote-up state of the state machine in response to detecting that the physical link between the access switch and the remote aggregation switch is up. The executable computer-readable code includes fourth computer-readable code to transition from the remote-up state to the formed state in response to detecting that the physical link between the access switch and the local aggregation switch is up. The vLAG aggregates the physical link between the access switch and the local aggregation switch and the physical link between the access switch and the remote aggregation switch into a virtual link transparent to the access switch.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 3 is a flowchart of an example method for using a state machine for forming and maintaining a vLAG of the physical links connecting multiple aggregation switches to an access switch.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, multiple physical links between an access switch and another switch may be aggregated so that they appear as a single link to the access switch, for redundancy, bandwidth increasing, and other reasons. However, the other switch becomes a single point of failure within this topology. If just one physical link between this switch and the access switch fails, the other physical links can still be used, but if the switch itself fails, none of the physical links that have been aggregated as a single link can be used.

Virtual link aggregation has therefore been proposed. In virtual link aggregation, the single switch is replaced by at least two aggregation switches. The access switch is connected to each aggregation switch by at least one physical link. The physical links connecting the aggregation switches to the access switch are aggregated within a virtual link aggregation group (vLAG). The result is that the physical links connecting the aggregation switches to the access switch appear as a single virtual link to the access switch.

Disclosed herein are techniques for such virtual link aggregation among the physical links between an access switch and multiple aggregation switches. As one example, there may be two aggregation switches. A state machine is maintained at each aggregation switch for establishing and maintaining the vLAG at each aggregation switch. The state machine includes an initialization state, a local-up state, a remote-up state, and a formed state, which are transition among responsive to detecting the physical links between the access switch and the aggregation switches as being up or down.

Figure 1:
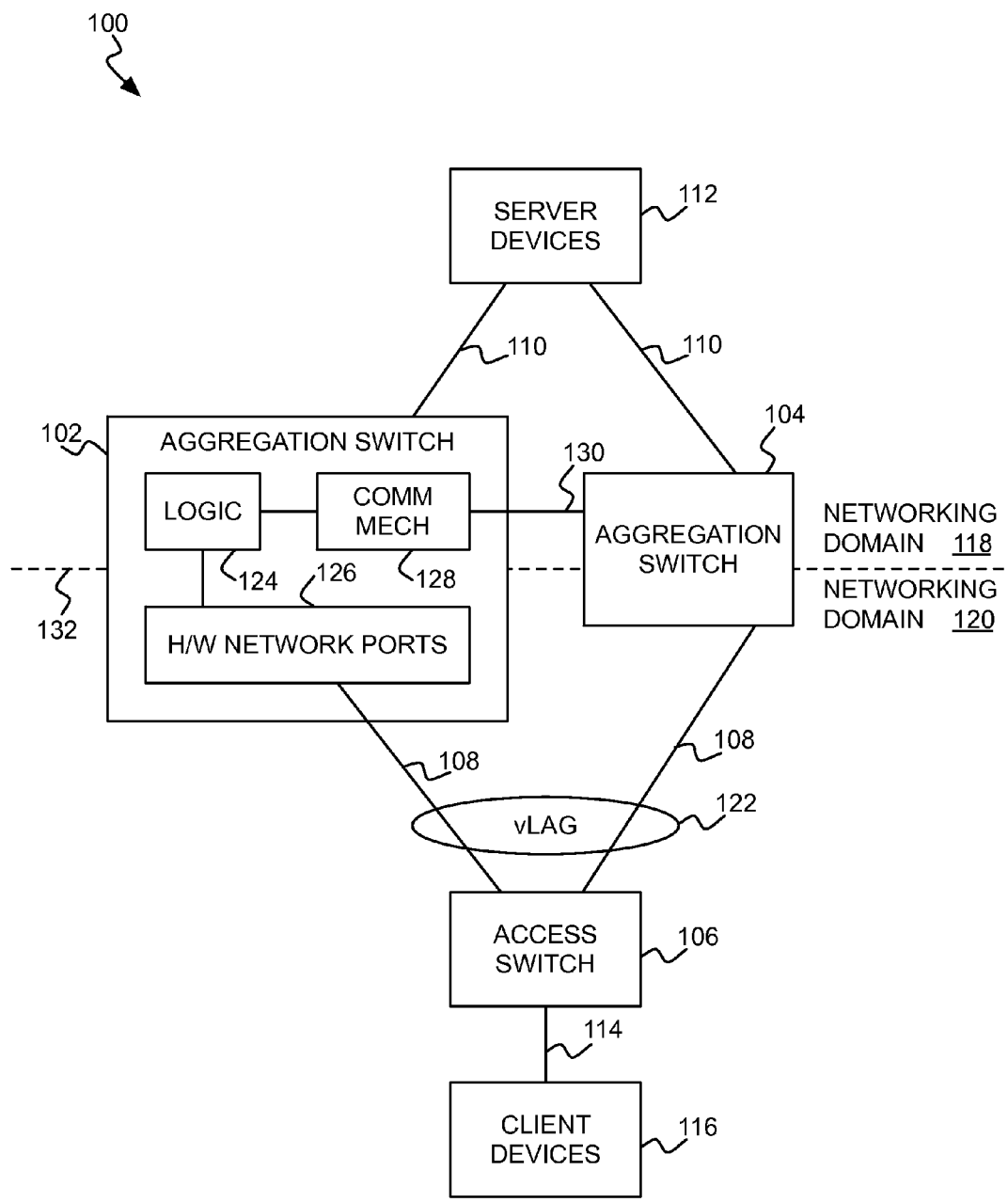
FIG. 1 is a diagram of an example system in which the physical links connecting a pair of aggregation switches to an access switch have been aggregated.

FIG. 1 shows an example system 100 in which a vLAG 122 can be established and maintained. The system 100 includes a pair of aggregation switches 102 and 104 and an access switch 106. More generally, there are multiple aggregation switches 102 and 104 (i.e., at least two aggregation switches 102 and 104), and at least one access switch 106.

The aggregation switches 102 and 104 are communicatively connected to server computing devices 112, or other types of computing devices and/or hardware resources, via physical links 110, whereas the access switch 106 is communicatively connected to client computing devices 116, or other types of computing devices, via physical links 114. The client devices 116 thus access the server devices 112 through the access switch 106 and the aggregation switches 102 and/or 104. The access switch 106 is referred to as such because the switch 106 is the point of access for the client devices 116 to reach the aggregation switches 102 and/or 104 and hence the server devices 112.

The aggregation switches 102 and 104 can demarcate a boundary 132 between a networking domain 118 including the server devices 112 and a networking domain 120 including the access switch 106 and the client devices 116. As such, the aggregation switches 102 and 104 span the boundary 132 and are part of both networking domains 118 and 120. The networking domain 118 may be a level-three (L3) networking domain, for instance, whereas the networking domain 120 may be a level-two (L2) networking domain. It is noted that there may be multiple networking domains 118 partitioned among the aggregation switches 102 and 104, and multiple networking domains 120 partitioned among multiple access switches 106 where multiple access switches 106 are present.

Each of the aggregation switches 102 and 104 is connected to the access switch 106 via one or more physical links 108. The physical links 108 between the access switch 106 and the aggregation switches 102 and 104 are aggregated within the vLAG 122. As such, the physical links 108 appear as a single virtual link that is transparent to the access switch 106. That is, when the access switch 106 communicates with the networking domain 118, the access switch 106 communicates over this virtual link, regardless of the particular physical link 108 over which such communication actually takes place. The aggregation switches 102 and 104 are referred to as such because the physical links 108 to the switches 102 and 104 are aggregated within the vLAG 122.

The aggregation switches 102 and 104 themselves are interconnected by a physical link 130, and thus communicate with one another. The physical link 130 permits the aggregation switch 102 to determine the status of the physical links 108 between the aggregation switch 104 and the access switch 106, as up or down. Likewise, the physical link 130 permits the aggregation switch 104 to determine the status of the physical links 108 between the aggregation switch 102 and the access switch 106, as up or down.

The aggregation switch 102 is depicted in FIG. 1 in representative detail as including logic 124, one or more hardware network ports 126, and a communication mechanism 128. It is understood that the aggregation switch 104 is likewise or at least similarly implemented. The hardware network ports 126 are connected by the physical links 108 to the access switch 106. When the aggregation switch 102 negotiates and establishes the connection to the access switch 106 so that the switches 102 and 106 can communicate with one another, the physical links 108 are said to be up, and otherwise are said to be down.

The communication mechanism 128 includes at least hardware, such as other hardware network ports, and is connected to the aggregation switch 104 by the physical link 130. The physical link 130 is a connection that can permit the aggregation switches 102 and 104 to communicate with one another outside the auspices of the networking domains 118 and 120. By comparison, the physical links 108 and 110 are connections over which communication occurs within the auspices of the networking domains 120 and 118, respectively.

The logic 124 is implemented in hardware, software, or a combination of hardware and software. As a hardware-only implementation, the logic 124 may be implemented as an application-specific integrated circuit (ASIC), a field-programmable gate array (FPGA), and so on. As a software-only implementation, the logic 124 may be considered as computer-executable code or one or more software programs or modules. As a combination software-and-hardware implementation, the logic 124 may be considered as this code, as well as one or more hardware components, such as the processor that executes the code, the computer-readable data storage medium that stores the code, and so on.

The logic 124 maintains a state machine for the aggregation switch 102 by which the aggregation switch 102 is to assist in establishing and maintaining aggregation of the physical links 108 between the aggregation switches 102 and 104 and the access switch 106 within the vLAG 122 as a virtual link. Each aggregation switch 102 and 104 maintains its own state machine. The current state of each state machine can differ. The aggregation switch 102 maintains its state machine in relation to the aggregation switch 102 itself being a local aggregation switch and the aggregation switch 104 (and any other aggregation switch) being a remote aggregation switch. Likewise, the aggregation switch 104 maintains its state machine in relation to the aggregation switch 104 itself being a local aggregation switch and the aggregation switch 102 (and any other aggregation switch) being a remote aggregation switch.

Figure 2:
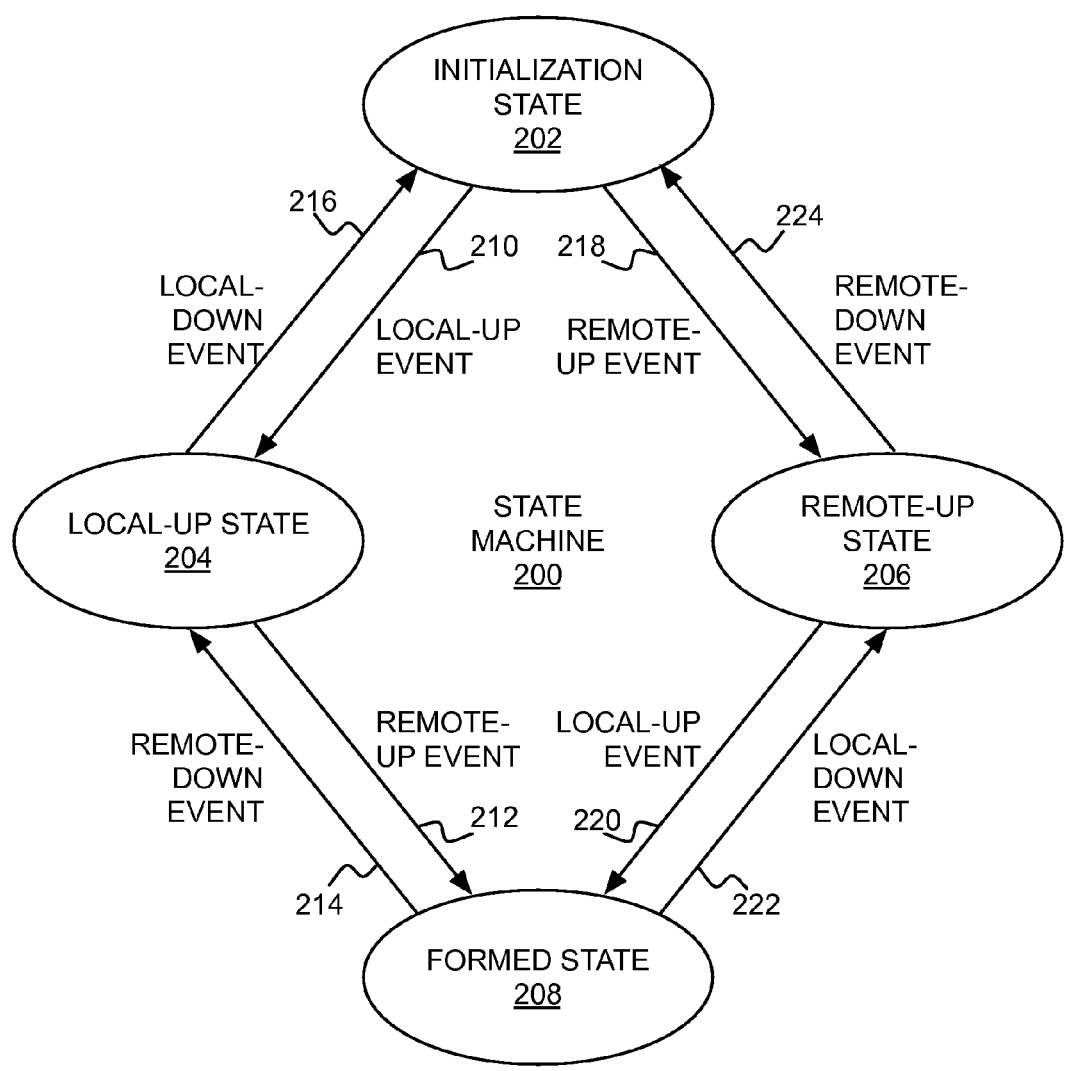
FIG. 2 is a diagram of an example state machine for forming and maintaining a virtual link aggregation group (vLAG) of the physical links connecting multiple aggregation switches to an access switch.

FIG. 2 shows such an example state machine 200. Each of the aggregation switches 102 and 104 maintains its own state machine 200, and each state machine 200 can be in a different state. However, for explanatory purposes, the state machine 200 is described in relation to the aggregation switch 102. As such, the aggregation switch 102 is the local aggregation switch, and the aggregation switch 104 is the remote aggregation switch.

The state machine 200 includes four states 202, 204, 206, and 208. At any given time, the state machine 200 is in just one of the states 202, 204, 206, and 208, as the current state of the state machine 200. The state machine 200 transitions among the states 202, 204, 206, and 208 just in relation to defined edges, or transitions, 210, 212, 214, 216, 218, 220, 222, and 224. That is, the state machine 200 cannot transition among the states 202, 204, 206, and 208, except along the edges 210, 212, 214, 216, 218, 220, 222, and 224. For example, the state machine 200 cannot transition directly between the states 204 and 206 because there is no edge directly connecting the states 204 and 206, and likewise cannot transition directly between the states 202 and 208 because there is no edge directly connecting the states 202 and 208.

The default state of the state machine 200 is the initialization state 202, such as when the aggregation switch 102 is first turned on and/or booted or rebooted. In the initialization state 202, the physical link 108 between the access switch 106 and the aggregation switch 102 is down, the physical link 108 between the access switch 106 and the aggregation switch 104 is down, and the vLAG 122 is down. The vLAG 122 can be up or down. That the vLAG 122 is down means that the physical links 108 have not yet been aggregated within the vLAG 122. That the vLAG 122 is up means that the physical links 108 have been aggregated within the vLAG 122 to expose the physical links 108 as a single virtual link to the access switch 106 in a transparent manner.

The physical links 108 can likewise each be up or down. That the physical link 108 between the aggregation switch 102 and the access switch 106 is down means that the aggregation switch 102 has not yet connected and negotiated with the access switch 106 such that the two switches 102 and 106 cannot yet communicate with one another, or the logic 124 has not yet detected that such communication can occur. That the physical link 108 between the aggregation switch 102 and the access switch 106 is up means that the aggregation switch 102 has connected and negotiated with the access switch 106 such that the two switches 102 and 106 can communicate with one another, and the logic 124 has detected that such communication can occur.

That the physical link 108 between the aggregation switch 104 and the access switch 106 is down means that the aggregation switch 104 has not yet connected and negotiated with the access switch 106 such that the two switches 104 and 106 cannot yet communicate with one another, or the logic 124 has not yet detected that such communication can occur. The logic 124 detects that such communication can occur be receiving notification from the aggregation switch 104 over the physical link 130. Therefore, the physical link 108 may be considered down if the physical link 130 is down, such that the aggregation switches 102 and 104 cannot communicate with one another thereover. That the physical link 108 between the aggregation switch 104 and the access switch 106 is up means that the aggregation switch 104 has connected and negotiated with the access switch 106 such that the two switches 104 and 106 can communicate with one another, and the logic 124 has detected that such communication can occur.

In the local-up state 204, the physical link 108 between the (local) aggregation switch 102 and the access switch 106 is up, but the physical link 108 between the (remote) aggregation switch 104 and the access switch 106 is down, and the vLAG 122 is down. In the remote-up state 206, the physical link 108 between the (local) aggregation switch 102 and the access switch 106 is down, the physical link 108 between the (remote) aggregation switch 104 and the access switch 106 is up, and the vLAG 122 is down. In the formed state 208, which can also be referred to as a vLAG state, the physical link 108 between the (local) aggregation switch 102 and the access switch 106 and the physical link 108 between the (remote) aggregation switch 104 and the access switch 106 are both up, and the vLAG 122 is up.

The state machine 200 transitions from the initialization state 202 to the local-up state 204 along an edge 210 corresponding to a local-up event. The local-up event is when the logic 124 has detected that the physical link 108 between the (local) aggregation switch 102 and the access switch 106 is now up. The state machine 200 transitions from the local-up state 204 to the formed state 208 along an edge 214 corresponding to a remote-up event. The remote-up event is when the logic 124 has detected that the physical link 108 between the (remote) aggregation switch 104 and the access switch 106 is now up.

The state machine 200 transitions from the formed state 208 along an edge 214 corresponding to a remote-down event. The remote-down event is when the logic 124 has detected that the physical link 108 between the (remote) aggregation switch 104 and the access switch 106 is now down. The state machine 200 transitions from the local-up state 204 to the initialization state 20 along an edge 216 corresponding to a local-down event. The local-down event is when the logic 124 has detected that the physical link 108 between the (local) aggregation switch 102 and the access switch 106 is now down.

The state machine 200 transitions from the initialization state 202 to the remote-up state 206 along an edge 218 corresponding to the remote-up event. The state machine 200 transitions from the remote-up state 206 to the formed state 208 along an edge 220 corresponding to the local-up event. The state machine 200 transitions from the formed state 208 to the remote-up state along an edge 222 corresponding to the local-down event. The state machine transitions from the remote-up state along an edge 224 corresponding to the remote-down event.

There are thus four total events: local-up, remote-up, local-down, and remote-down. The state to which the state machine 200 transitions responsive to a given event occurring depends on the current state of the state machine 200, and the outward edges from that state. The edges 210, 212, 214, 216, 218, 220, and 222 are directional, and each edge proceeds in just one direction, from a given state and to a given state.

As an example, the physical link 108 between the (local) aggregation switch 102 and the access switch 106 may previously have been down and is now detected as being up, such that the local-up event occurs. If the state machine 200 is currently in the initialization state 202 then the state machine 200 transitions along the edge 210 to the local-up state 204, whereas if the state machine 200 is currently in the remote-up state 206 then the state machine 200 transitions along the edge 220 to the formed state 220. Due to the construction of the state machine 200 as depicted in FIG. 2, the current state of the state machine 200 cannot be the initialization state 202 or the formed state 208 when the local-up event occurs.

When the state machine 200 enters the formed state 208 along the edge 212 from the local-up state 204 or along the edge 220 from the remote-up state 206, the logic 124 can perform one or more vLAG formation processes. A first such process, which may be in the form of a procedure call, is to enable the vLAG 122. The vLAG 122 can be enabled because the physical links 108 between the access switch 106 and both the aggregation switches 102 and 104 are now up. A second such process, which may also be in the form of a procedure call, is to notify the (remote) aggregation switch 104 that the (local) aggregation switch 102 has enabled the vLAG 122.

When the state machine 200 exits the formed state 208 along the edge 214 to the local-up state 204 or along the edge 222 to the remote-up state 206, the logic 124 can similarly perform one or more vLAG termination processes. A first such process, which may be in the form of a procedure call, is to disable the vLAG 122. The vLAG 122 is disabled because the physical links 108 between the access 106 and the aggregation switches 102 and 104 are not now both up. A second such process, which may also be in the form of a procedure call, is to notify the (remote) aggregation switch 104 that the (local) aggregation switch 102 has disabled the vLAG 122.

As noted above, the state machine 200 is maintained at each aggregation switch 102 and 104 separately. At the aggregation switch 102, the state machine 200 is maintained in relation to the aggregation switch 102 being the local switch and the aggregation switch 104 being the remote switch. At the aggregation switch 104, the state machine 200 is maintained in relation to the aggregation switch 104 being the local switch and the aggregation switch 102 being the remote switch.

Assuming that both aggregation switches 102 and 104 are functioning properly, as well as the physical link 130, in general the state machine 200 at each switch 102 and 104 is in the initialization state 202 and the formed state 208 at the same time (taking into account minor time synchronization issues, that no race conditions exist, and so on). When the state machine 200 at the aggregation switch 102 is in the local-up state 204, the state machine at the aggregation switch 104 is in the remote-up state 206, and vice-versa. This is because the aggregation switch 102 is local to itself and remote to the aggregation switch 104, and the aggregation switch 104 is local to itself and remote to the aggregation switch 102.

FIG. 3 shows an example method 300 for the vLAG 122 in relation to the state machine 200. The method 300 is performed at each aggregation switch 102 and 104. The method 300 includes maintaining the state machine 200 (302). Such maintenance can include keeping track of the current state of the state machine 200, and when the aggregation switch 102 or 104 in question is powered on, boots, or reboots, defaulting the state machine 200 to the initialization state 202.

The method 300 also includes transitioning among the states 202, 204, 206, and 208 of the state machine 200 over the edges 210, 212, 214, 216, 218, 220, and 22 (304). The state machine 200 transitions to the local-up state 204 from the initialization state 202 along the edge 210 in response to detecting the local-up event (306). The state machine 200 transitions to the formed state 208 from the local-up state 204 along the edge 212 in response to detecting the remote-up event (308). In part 308, one or more vLAG formation processes are also performed, as has been described. The state machine 200 transitions to the local-up state 204 from the formed state 208 along the edge 214 in response to detecting the remote-down event (310). In part 310, one or more vLAG termination processes are performed, as has been described. The state machine 200 transitions to the initialization state 202 from the local-up state 204 along the edge 216 in response to detecting the local-down event (312).

The state machine 200 transitions to the remote-up state 206 from the initialization state 202 along the edge 218 in response to detecting the remote-up event (314). The state machine 200 transitions to the formed state 208 from the remote-up state 206 along the edge 220 in response to detecting the local-up event (316). In part 316, one or more vLAG formation processes are also performed, as has been described. The state machine 200 transitions to the remote-up state 206 from the formed state 208 along the edge 222 in response to detecting the local-down event (318). In part 318, one or more vLAG termination processes are performed, as has been described. The state machine 200 transitions to the initialization state 202 from the remote-up state 206 along the edge 224 in response to detecting the remote-down event (320). Parts 306, 308, 310, 312, 314, 316, 318, and 20 are not performed in any particular order. The particular part that is performed depends on the current state 202, 204, 206, or 208 of the state machine 200, and the event that has been detected.

The techniques disclosed herein provide for the aggregation of the physical links 108 between multiple aggregation switches 102 and 104 and at least one access switch 106 within a vLAG 122, as a virtual link that is transparent to the access switch 106. As such, there is no single point of failure within the system 100. For instance, if the aggregation switch 102 fails, the client devices 116 can still communicate with the server devices 112 via the access switch 106 communicating with the aggregation switch 104 that has not failed. The techniques disclosed herein employ a state machine 200 maintained at each aggregation switch 102 and 104 to coordinate establishment and maintenance of the vLAG 122, as has been described.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:

performing virtual link aggregation, by a local aggregation switch, among physical links between an access switch and a pair of aggregation switches including the local aggregation switch and a remote aggregation switch;

maintaining, by the local aggregation switch, a state machine for the local aggregation switch to provide for the virtual link aggregation, the state machine comprising a plurality of states include an initialization state, a local-up state, a remote-up state, and a formed state;

in response to the physical link between the access switch and the local aggregation switch and the physical link between the access switch and the remote aggregation switch being down, and a virtual link aggregation group (vLAG) being down, maintaining, by the local aggregation switch, the state machine in the initialization state;

in response to the physical link between the access switch and the local aggregation switch being up, the physical link between the access switch and the remote aggregation switch being down, and the vLAG being down, maintaining, by the local aggregation switch, the state machine in the local-up state;

in response to the physical link between the access switch and the remote aggregation switch being up, the physical link between the access switch and the local aggregation switch being down, and the vLAG being down, maintaining, by the local aggregation switch, the state machine in the remote-up state; and in response to the physical link between the access switch and the local aggregation switch and the physical link between the access switch and the remote aggregation switch being up, and the vLAG being up, maintaining, by the local aggregation switch, the state machine in the formed state.

2. The method of claim 1, further comprising:

transitioning, by the local aggregation switch, the state machine from the initialization state to the local-up state in response to detecting that the physical link between the access switch and the local aggregation switch is up.

3. The method of claim 2, further comprising:

transitioning, by the local aggregation switch, the state machine from the local-up state to the formed state in response to detecting that the physical link between the access switch and the remote aggregation switch is up.

4. The method of claim 1, further comprising:
transitioning, by the local aggregation switch, the state machine from the initialization state to the remote-up state in response to detecting that the physical link between the access switch and the remote aggregation switch is up.

5. The method of claim 4, further comprising:
transitioning, by the local aggregation switch, the state machine from the remote-up state to the formed state in response to detecting that the physical link between the access switch and the local aggregation switch is up.

6. The method of claim 1, further comprising:
transitioning, by the local aggregation switch, the state machine from the formed state to the local-up state in response to detecting that the physical link between the access switch and the remote aggregation switch is down.

7. The method of claim 6, further comprising:
transitioning, by the local aggregation switch, the state machine from the local-up state to the initialization state in response to detecting that the physical link between the access switch and the local aggregation switch is down.

8. The method of claim 1, further comprising:
transitioning, by the local aggregation switch, the state machine from the formed state to the remote-up state in response to detecting that the physical link between the access switch and the local aggregation switch is down.

9. The method of claim 8, further comprising:
transitioning, by the local aggregation switch, the state machine from the remote-up state to the initialization state in response to detecting that the physical link between the access switch and the remote aggregation switch is down.

10. The method of claim 1, further comprising:
upon transitioning the state machine to the formed state, performing, by the local aggregation switch, one or more vLAG formation processes corresponding to and denoting that the vLAG has been formed.

11. The method of claim 1, further comprising:
upon transitioning the state machine from the formed state, performing, by the local aggregation switch, one or more vLAG termination processes corresponding to and denoting that the vLAG has been terminated.

12. The method of claim 1, wherein the vLAG aggregates the physical links between the access switch and the pair of aggregation switches into a virtual link transparent to the access switch.

13. The method of claim 1, wherein the method is also performed by the remote aggregation switch.

14. An aggregation switch comprising:
a hardware network port to communicate with an access switch over a physical link between the access switch and the aggregation switch, the physical link to be aggregated with a physical link between the access switch and a remote aggregation switch within a virtual link aggregation group (vLAG) corresponding to a virtual link transparent to the access switch;
a communication mechanism comprising one or more other hardware network ports to communicate with the remote aggregation switch to receive a status of the physical link between the access switch and the remote aggregation switch as one of up and down; and
hardware to implement logic to maintain a state machine for the aggregation switch by which the aggregation switch is to assist in aggregation of the physical link between the access switch and the aggregation switch and the physical link between the aggregation access switch and the remote aggregation switch as the vLAG, by:
where the physical link between the access switch and the local aggregation switch and the physical link between the access switch and the remote aggregation switch are down, and the vLAG is down, maintaining the state machine in an initialization state;
where the physical link between the access switch and the local aggregation switch is up, the physical link between the access switch and the remote aggregation switch is down, and the vLAG is down, maintaining the state machine in the local-up state;
where the physical link between the access switch and the remote aggregation switch is up, the physical link between the access switch and the local aggregation switch is down, and the vLAG is down, maintaining the state machine in the remote-up state; and
where the physical link between the access switch and the local aggregation switch and the physical link between the access switch and the remote aggregation switch are up, and the vLAG is up, maintaining the state machine in the formed state.

15. The aggregation switch of claim 14, wherein the hardware comprises one of an applications-specific integrated circuit (ASIC) and a field-programmable gate array (FPGA) that implements the logic.

16. The aggregation switch of claim 14, wherein the hardware comprises a processor and a computer-readable data storage medium storing computer-executable code that is executed by the processor to implement the logic.

17. A computer program product comprising:
a non-transitory computer-readable storage medium having executable computer-readable code embodied therein that when executed by a processor causes the processor to:
perform virtual link aggregation among physical links between an access switch and a pair of aggregation switches including a local aggregation switch and a remote aggre ag tion switch by maintaining a state machine;
transition the state machine from an initialization state for a local aggregation switch to a local-up state in response to detecting that a physical link between an access switch and the local aggregation switch is up;
transition the state machine from the initialization state to a formed state of the state machine in response to detecting that a physical link between the access switch and a remote aggregation switch is up;
transition the state machine from the initialization state to a remote-up state of the state machine in response to detecting that the physical link between the access switch and the remote aggregation switch is up; and
transition the state machine from the remote-up state to the formed state in response to detecting that the physical link between the access switch and the local aggregation switch is up,
wherein a virtual link aggregation group (vLAG) aggregates the physical link between the access switch and the local aggregation switch and the physical link between the access switch and the remote aggregation switch into a virtual link transparent to the access switch.

18. The computer program product of claim 17, wherein the executable computer-readable code when executed by the processor further causes the processor to:

transition the state machine from the formed state to the local-up state in response to detecting that the physical link between the access switch and the remote aggregation switch is down;

transition the state machine from the local-up state to the initialization state in response to detecting that the physical link between the access switch and the local aggregation switch is down;

transition the state machine from the formed state to the remote-up state in response to detecting that the physical link between the access switch and the local aggregation switch is down; and transition the state machine from the remote-up state to the initialization state in response to detecting that the physical link between the access switch and the remote aggregation switch is down.

19. The computer program product of claim 17, wherein the executable computer-readable code when executed by the processor further causes the processor to:

maintain the state machine in the initialization state, in response to the physical link between the access switch and the local aggregation switch and the physical link between the access switch and the remote aggregation switch being down, and the vLAG being down, maintain the state machine in the local-up state, in response to the physical link between the access switch and the local aggregation switch being up, the physical link between the access switch and the remote aggregation switch being down, and the vLAG being down, maintain the state machine in the remote-up state, in response to the physical link between the access switch and the remote aggregation switch being up, the physical link between the access switch and the local aggregation switch being down, and the vLAG being down, maintain the state machine in the formed state, in response to the physical link between the access switch and the local aggregation switch and the physical link between the access switch and the remote aggregation switch being up, and the vLAG being up.

* * * * *